United States Patent [19]
Falk et al.
[11] Patent Number: 5,033,016
[45] Date of Patent: Jul. 16, 1991

[54] COHERENCE MULTIPLEXED ARITHMETIC/LOGIC UNIT

[75] Inventors: R. Aaron Falk, Renton; Theodore L. Houk, Seattle, both of Wash.

[73] Assignee: The Boeing Company, Seattle, Wash.

[21] Appl. No.: 488,898

[22] Filed: Mar. 6, 1990

[51] Int. Cl.[5] ..................... G06F 1/04
[52] U.S. Cl. ..................... 364/713
[58] Field of Search ............ 364/713, 746, 822, 841

[56] References Cited

U.S. PATENT DOCUMENTS

| | | | |
|---|---|---|---|
| 4,064,400 | 12/1977 | Akushsky et al. | 364/746 |
| 4,121,298 | 10/1978 | Akushsky et al. | 364/746 |
| 4,363,106 | 12/1982 | Tai | 364/746 |
| 4,418,394 | 11/1983 | Tai | 364/746 |
| 4,521,069 | 6/1985 | Ikeda | 350/96.13 |
| 4,671,605 | 6/1987 | Soref | 350/96.15 |
| 4,797,843 | 1/1989 | Falk et al. | 364/713 |
| 4,799,767 | 1/1989 | Woodruff | 350/269 |
| 4,799,797 | 1/1989 | Huggins | 356/345 |
| 4,860,279 | 8/1989 | Falk et al. | 370/1 |
| 4,864,524 | 9/1989 | Guiljoyle et al. | 364/713 |
| 4,866,698 | 9/1989 | Huggins et al. | 370/1 |
| 4,900,115 | 2/1990 | Heuring et al. | 364/713 X |
| 4,910,699 | 3/1990 | Capps et al. | 364/713 X |
| 4,926,367 | 5/1990 | Arrathoon | 364/713 |

OTHER PUBLICATIONS

Neyer, et al., "A Beam Propagation Analysis of Active and Passive Waveguide Crossings", Journal of Lightwave Technology, vol. LT-3, No. 3, Jun. 1985, pp. 635-642.

Izutsu et al., "Optical-Waveguide Hybrid Coupler", Optics Letters, vol. 7, No. 11, Nov. 1982, pp. 549-551.

Marhic, "Hierarchic and Combinatorial Star Couplers", Optics Letters, vol. 9, No. 8, Aug. 1984, pp. 368-370.

Szabo et al., "Residue Arithmetic and its Applications to Computer Technology", McGraw-Hill Book Company, New York, 1967.

*Primary Examiner*—Gary V. Harkcom
*Assistant Examiner*—Tan V. Mai
*Attorney, Agent, or Firm*—Foley & Lardner

[57] ABSTRACT

An optical computer arithmetic/logic unit using coherence multiplexing. A optical signal input into the device is distributed down two input channels. Each input channel contains different length optical fibers, or delay lines. To perform an operation, one delay line signal from each channel is selected. The two signals with their respective delays are multiplexed into output detectors which determine from optical interference the difference between the delay line lengths. The input from each channel coupled with the detected output can be set to perform residue arithmetic, or Boolean logic.

22 Claims, 10 Drawing Sheets

FIG. 1

| DECIMAL REPRESENTATION | "235" RESIDUE REPRESENTATION |
|---|---|
| 0 | 0 0 0 |
| 1 | 1 1 1 |
| 2 | 0 2 2 |
| 3 | 1 0 3 |
| 4 | 0 1 4 |
| 5 | 1 2 0 |
| 6 | 0 0 1 |
| 7 | 1 1 2 |
| 8 | 0 2 3 |
| 9 | 1 0 4 |
| 10 | 0 1 0 |
| 11 | 1 2 1 |
| 12 | 0 0 2 |
| ⋮ | |
| 27 | 1 0 2 |
| 28 | 0 1 3 |
| 29 | 1 2 4 |
| 30 | 0 0 0 |

| | |
|---|---|
| 1 | 1 1 1 |
| +2 | +0 2 2 |
| 3 | 1 0 3 |

| | |
|---|---|
| 9 | 1 0 4 |
| +3 | +1 0 3 |
| 12 | 0 0 2 |

| RELATION | CHANNEL I (120) 2 | (121) 1 | (122) 0 | CHANNEL II (123) 0 | (124) 1 | (125) 2 | SPACING BETWEEN POINT SOURCES 120-125 | OUTPUT |
|---|---|---|---|---|---|---|---|---|
| 0+0=0 | ○ | ○ | ● | ● | ○ | ○ | 1d | 0 |
| 0+1=1 | ○ | ○ | ● | ○ | ● | ○ | 2d | 1 |
| 0+2=2 | ○ | ○ | ● | ○ | ○ | ● | 3d | 2 |
| 1+0=1 | ○ | ● | ○ | ● | ○ | ○ | 2d | 1 |
| 1+1=2 | ○ | ● | ○ | ○ | ● | ○ | 3d | 2 |
| 1+2=0 | ○ | ● | ○ | ○ | ○ | ● | 4d | 0 |
| 2+0=2 | ● | ○ | ○ | ● | ○ | ○ | 3d | 2 |
| 2+1=0 | ● | ○ | ○ | ○ | ● | ○ | 4d | 0 |
| 2+2=1 | ● | ○ | ○ | ○ | ○ | ● | 5d | 1 |

● -SOURCE ON
○ -SOURCE OFF

| CH 1 | CH 2 | OUTPUT |
|---|---|---|
| 0 | 0 | 0 |
| 0 | 1 | 1 |
| 1 | 0 | 1 |
| 1 | 1 | 1 |

| CH 1 | CH 2 | OUTPUT |
|---|---|---|
| 1/2d | -1/2d | 1d |
| 1/2 d | -3/2d | 2d |
| 3/2 d | -1/2d | 2d |
| 3/2 d | -3/2d | 3d |

COHERENCE MULTIPLEXED ARITHMETIC/LOGIC UNIT

BACKGROUND OF THE INVENTION

1. Field of the Invention

This invention relates to an optical computer arithmetic/logic unit and optical coherence multiplexing. The invention uses the arithmetic/logic unit to perform residue arithmetic or Boolean logic.

2. Description of Related Technology

In the past, two unrelated technologies have developed in optics The first, relating to arithmetic/logic units is described in section A which follows, and the second relating to coherence multiplexing is described in section B which follows.

A. Optical Arithmetic/Logic Unit

U.S. Pat. No. 4,797,843 entitled "Parallel Optical Arithmetic/Logic Unit", and incorporated herein by reference, describes an arithmetic/logic unit which uses residue arithmetic. Optical computers use residue arithmetic based on the compatibility between the parallel nature of arithmetic operations in residue arithmetic and the parallel processing capability of optics. In residue arithmetic, a number is represented by an ordered sequence or n-tuple where each entry is given by the remainder after division by a set of n mutually prime moduli. Each entry is referred to as a residue and is related to the modulus associated with that position of the n-tuple. It is the property of residue numbers that integer arithmetic (addition, subtraction and multiplication) proceeds on each entry separately without the need for carry operations. FIG. 1 gives examples of residue arithmetic in a "235" representation where 2 is the modulus associated with the left most entry, 3 with the central entry, and 5 with the right most entry of the 3-tuple representation.

FIG. 2A shows the modulo 3 adder from U.S. Pat. No. 4,797,843 which performs residue addition. Six light point sources 120–125 which can be turned on or off are provided spaced a distance d apart. Point sources 120–122 make up channel I (170), while sources 123–125 make up channel II (172). Lenses 130–134 line along the focal plane B one focal length f away from the light sources in plane A to produce Fourier transforms of the source configuration generated when one of the sources is turned on from each input channel I and channel II. Fourier filters 140–144 lie along focal plane C one focal length away from lenses 130–134 in plane B. The Fourier transform depends only on the structure of the pattern, not its absolute location. Thus, sources a distance *2d* apart will produce the same transform whether the sources 122 and 124 are on, or sources 121 and 123 are on.

For example, as shown in FIG. 2A, light from source 121 of channel I and source 124 of channel II passes with highest transmission through the filter 143 labeled "*4d*" as the sources 121 an 124 are a distance "*4d*" apart. This energy is collected by lenses 150–154 in the lens array along focal plane D located one focal length away from filters 141–144. The energy allowed to pass through lenses 150–154 is then focused onto light collectors 160–164 located in Plane E one focal length away from lenses 150–154. The maximum intensity, by at least a two-to-one margin, will fall on collector 163. Thresholding will then allow energy to pass through only one channel, the one corresponding to the correct answer. The collector 163, behind the "*4d*" filter 143, is connected to designate a "0" output. Thus, a "1-2" combination from sources 120–125 result in a "0" output, as required by the table in FIG. 2B for modulo 3 addition. FIG. 2B also demonstrates other configurations of light sources and their corresponding modulo 3 addition representation.

B. Optical Coherence Multiplexing

U.S. Pat. No. 4,799,767 entitled "Coherence Multiplexing of Optical Sensors", and incorporated herein by reference, describes an optical multiplexer. The multiplexing technique uses phase multiplexing and avoids the expected $N\pi$ phase redundancy through use of short coherence length sources.

FIG. 3A shows a coherence multiplexing system described in U.S. Pat. No. 4,799,767. The multiplexing system includes optical source 400, paralleled sensors 200 and 202, and detector unit 204 which includes paralleled detectors 206 and 208. Any number of sensors and detectors may be used, and the use of two of each is only an example. Y coupler 210 serves to divide an input signal from optical source 400 to the sensors 200 and 202, and Y coupler 216 recombines the signal which has passes through the sensors 200 and 202 onto bus 218. Similarly, Y coupler 230 receives the signal from bus 218 and divides (equally) the signal between detectors 206 and 208. Optical outputs 236 and 246 of the detectors may be converted to electrical signals by photodiodes 238 and 248.

FIG. 3B shows a typical Y coupler 330 used in the multiplexing system. The Y coupler serves as a divider by equally dividing an input signal in line 332 into two parts output from lines 334 and 336. The Y coupler serves as a combiner by combining power input to lines 334 and 336 into output line 332.

The sensors and detectors in the multiplexer of FIG. 3A are very similar. Sensors 200 and 202 are Mach-Zehnder interferometers. The sensors accept an input optical signal using respective Y couplers 212 and 222 which divides the input signal equally down sensor arms L1,L2 and L3,L4. Sensors arms such as L1,L2 have a slightly different length (shown exaggerated in FIG. 3A) to generate a phase shift when recombined using X couplers 214 and 224. Similarly, detectors 206 and 208 in detecting unit 204 are Mach-Zehnder interferometers which include Y couplers 232 and 242, X couplers 234 and 244, and detector arm pairs L11–L22 and L33–L44.

The sensors and detectors in the multiplexer of FIG. 3A serve in pairs, e.g., sensor 200 paired with detector 206, and sensor 202 paired with sensor 208. The detector 206 has a path length difference (L11–L22) very close to sensor 200 path difference (L1–L2), and detector interferometer 208 has a path length difference (L33–L44) very close to sensor 202 path difference (L3–L4).

Modulation using the sensor-detector pairs is described in U.S. Pat. No. 4,866,698 incorporated herein by reference. This process is described here with reference to the sensor 200-detector 206 pair. Sensor 200 is constructed such that in the absence of an electrical input signal, there exists an optical path length difference LM between modulated arm L1 and reference arm L2. Thus the lengths of the modulated and reference arms can be designated X+LM and X, respectively. Detector 206 is constructed such that arms L11 and L22 have a path length difference of LD, and the optical path lengths of the first and second arms can therefore be designated Y+LD and Y.

As a result of the described arrangement, the optical signal produced on optical output 236 includes radiation that has traveled four different path lengths. Ignoring the common path lengths in the interconnecting cables or waveguides, these path length are:

$$X+Y \quad (1)$$

$$X+Y+LD \quad (2)$$

$$X+Y+LM \quad (3)$$

$$X+Y+LM+LD \quad (4)$$

In accordance with the phase modulation technique of the present invention, path length differences LD and LM are made to be approximately equal to one another and, in particular, the difference between path length differences LD and LM is made less than the coherence length $L_s$ of optical source 100. Under these conditions, radiation that has traveled the optical path of length X+Y+LD will interfere with radiation that has traveled the optical path of length X+Y+LM. When such interference is produced, modulation of the value LM by variation of the electrical input signal o the input data channel will produce intensity modulation at optical output 236. This optical output 236 signal can be converted into an electrical signal by a photodetector 238.

FIG. 3C shows a typical X coupler 300 which can be used in the detectors and sensors. The X coupler accepts two input signals such as 312 and 314 and outputs the signals along lines 322 and 324. Where the lines 322 and 324 cross, interference occurs which is controlled by electrode 320. Electrode 320 uses the electro optic effect to cause signals to interfere so that the output signal travels more dominantly down one arm than the other arm. Typically in a detector or sensor, the X coupler is controlled using electrode 320 to output complementary signals on lines 322 and 324. The X coupler shown is described by A. Neyer, W. Mevenkamp, L. Thylen and B. Lagerstorm in "A Beam Propagation Analysis of Active and X Analysis of Active and Passive Waveguide Crossings", *J. Lightwave Tech.*, LT-3, 635-642 (985) incorporated herein by reference.

FIG. 4 shows an alternative multiplexing system described in U.S. Pat. No. 4,799,767 with the detectors unit 204 in FIG. 3A substituted with a new detector unit 204A of FIG. 4. Instead of using multiple detectors of precise path length differences, the detector unit 204A uses a single Mach-Zehnder interferometer detector 348 with one arm having a variable length. The path length difference may thus be controlled to match the path difference of either sensor 200 or 202. Detector 348 in detector unit 204A consists of a Y coupler 350, an X junction 360, detector arms 352 and 354, phase shifting electrodes 358, and electrode delay voltage source 356 operate to impose a delay of kd, where k is an integer and d is a fixed delay time. The detector arms 352 and 354 work like detector arms of the detectors of FIG. 3A except the phase shifting electrodes 358 and electrode delay voltage source 356 serves to vary one detector arm length. Thus, optical output signal 362 of detector unit 204A can be controlled to detect if the input signal is from a particular input sensor (e.g. 200 or 202). The optical output of the detectors 362 may be converted to an electrical signal by photodiode 364. Use of the X coupler, Y couplers, and swept delay lines arms in a detector is described by M. Izutsu, A. Enokihara and T. Sueta in "Optical-waveguide Hybrid Coupler", *Opt. Lett.*, 7, 549-551 (1982) incorporated herein by reference.

SUMMARY OF THE INVENTION

The current disclosure combines the two areas of optical arithmetic/logic units and optical multiplexers into a single device. This technique offers the additional advantage over prior art arithmetic/logic units by being readily fabricated in integrated optics using currently available capabilities.

BRIEF DESCRIPTION OF THE DRAWINGS

Further details of the present invention are explained with the help of the attached drawings in which:

FIG. 1 is a table of examples of residue arithmetic in a "235" representation,

DETAILED DESCRIPTION OF THE PREFERRED EMBODIMENTS

Figure 5:
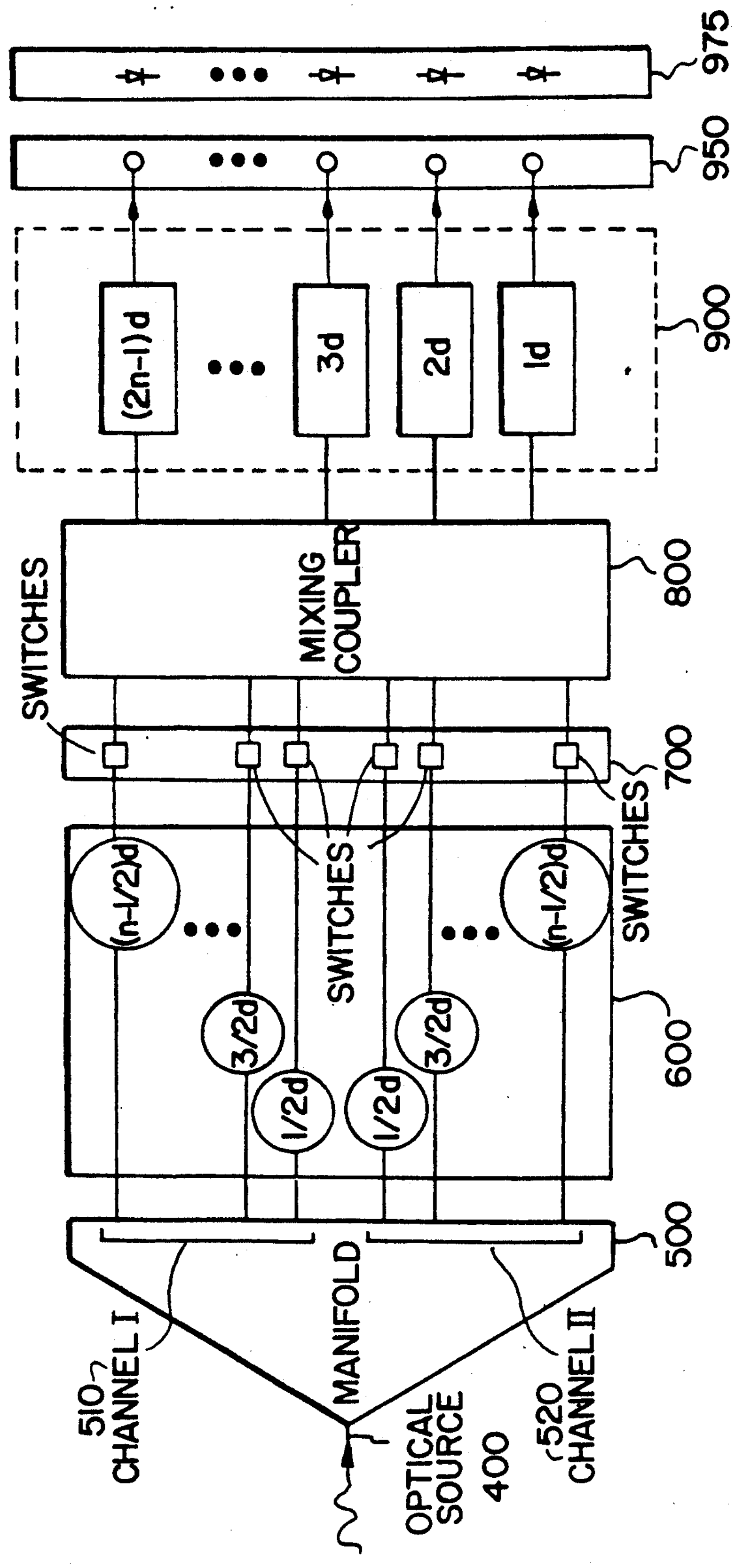
FIG. 5 is the layout of the first embodiment of the present, invention.

A first embodiment of a coherence multiplexed arithmetic/logic unit (CMALU) is shown in FIG. 5. The CMALU is composed of an optical source 400, a 1-to-2N manifold 500, 2N delay lines 600, 2N switches 700, a -2N-to-(2N−1) mixing coupler 800, detectors 900, optical outputs 950, and photodiodes 975.

Figure 6:
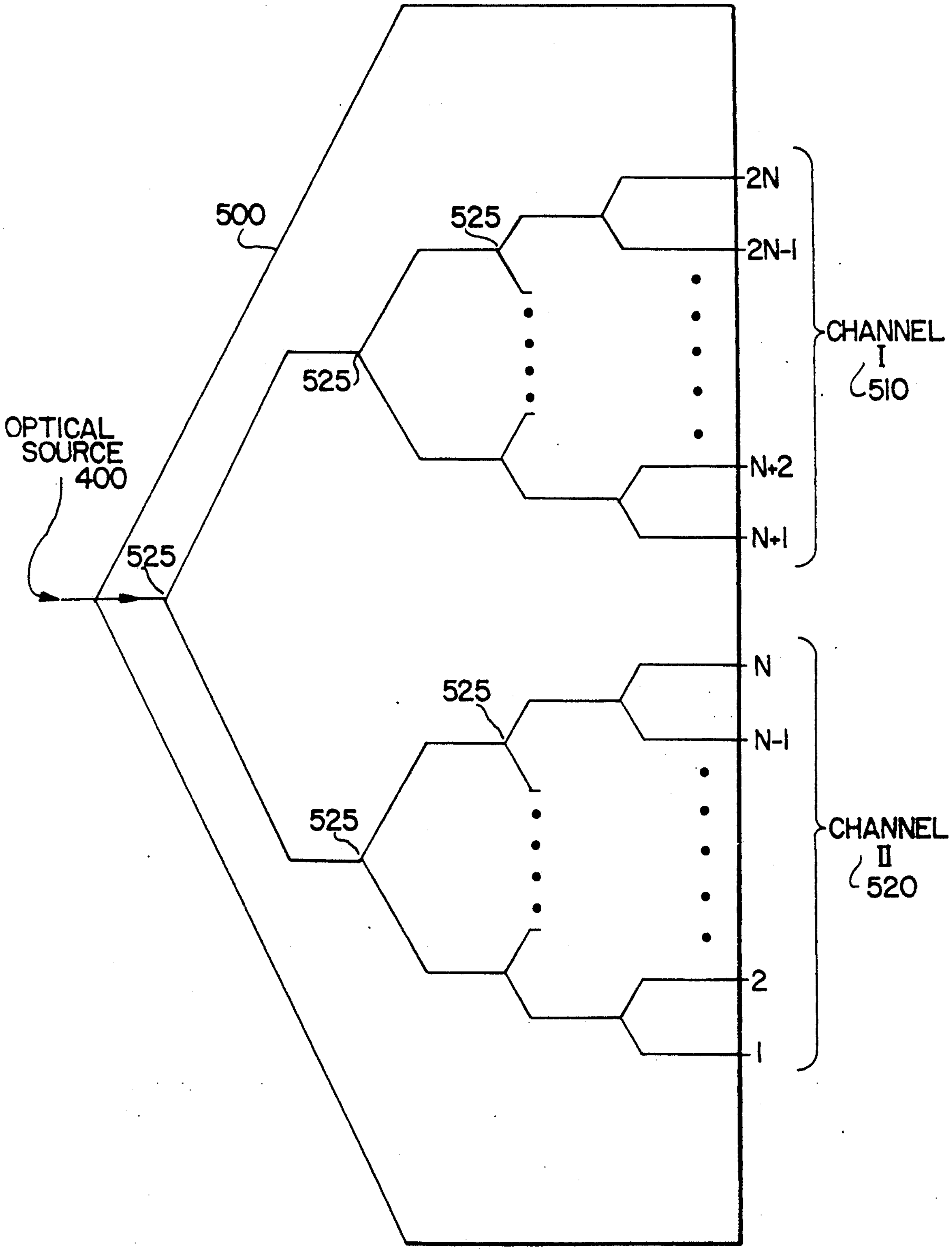
FIG. 6 is the 1-to-2N manifold composed of a binary tree of Y couplers.

Operation of the components of the CMALU begins with a light from a single optical source 400 injected into a 1-to-2N manifold 500 which is composed of two channels 510 and 520. The two channels are comparable with channel I (170) and channel II (172) shown in FIG. 2A. An example of an 1-to-2N manifold 500 is shown in FIG. 6. The manifold is composed of optical waveguides, either optical fibers or integrated optics depending on the coherence length of the source. The optical manifold equally distributes the signal to 2N waveguides using Y couplers 525 like the one shown in FIG. 3B.

Each waveguide from manifold 500 is connected to one of delay lines 600 which has a relative delay as indicated in FIG. 5. Channel I has relative delays of (½)d, (3/2) d, . . ., (n−½)d and channel II has relative delays of −(½)d, −(3/2)d, . . . , −(n−½)d. The delays are comparable to the spacing d between light sources 120–125 in FIG. 2A. For example, if the logic to be performed is residue addition using modulus 3, then in channel I and channel II, the integers 0 through 2 are represented with waveguide delays (½)d, (3/2)d, and (5/2)d in channel I, and −(½)d, −(3/2)d, and −(5/2)d in channel II.

Each waveguide in delay lines 600 is connected to one of the switches in 700. For a residue arithmetic operation, one switch from each channel is turned on and light from these two waveguides is passed to a 2N-to-(2N−1) mixing coupler 800. The mixing coupler 800 is designed such that light intensity introduced into any input is distributed equally to all outputs.

The mixing coupler 800 can be made by joining two of the manifolds like the one shown in FIG. 6 at the manifold optical source input points. A first difficulty with this approach is that the inputs and outputs are fixed as powers of 2, implying unused outputs. A second difficulty is the power losses accrued in the N-to-1 manifold which is a factor of 2 for each Y junction transversed by the light path.

Figure 3A:
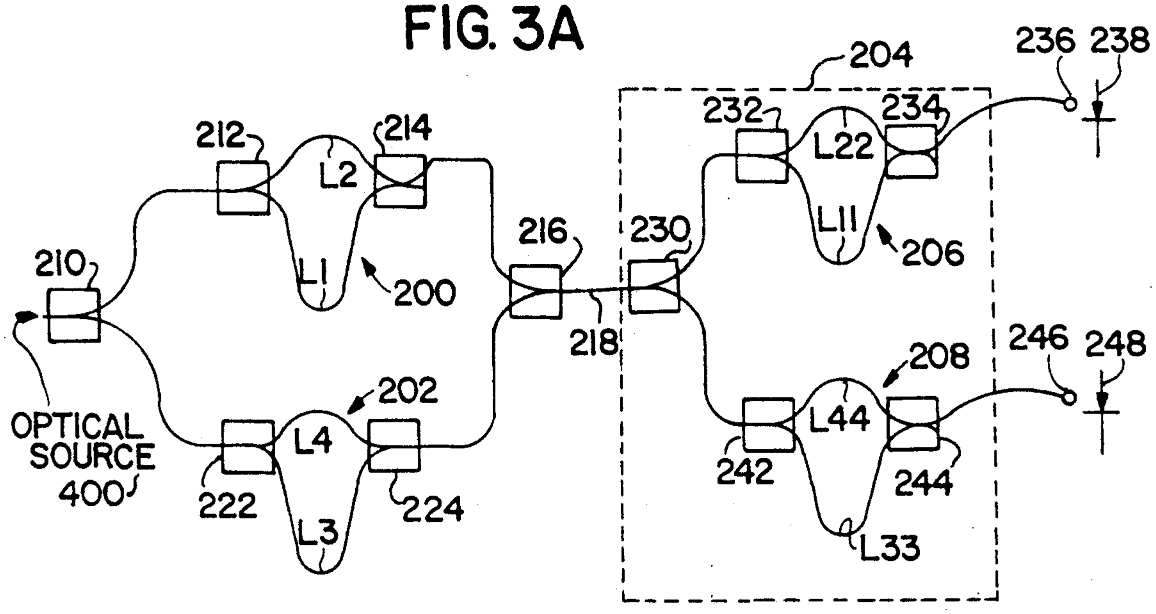
FIG. 3A is a coherence multiplexing system using fixed arm length sensor and detector interferometers.
Figure 3C:
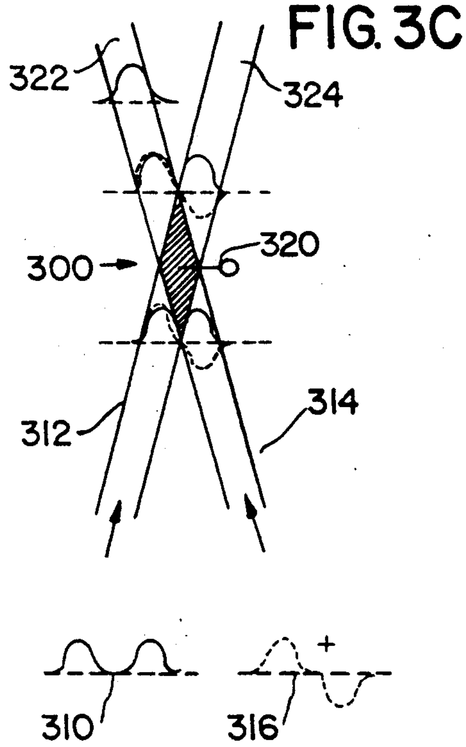
FIG. 3C shows a 2-to-2 or X coupler.
Figure 7:
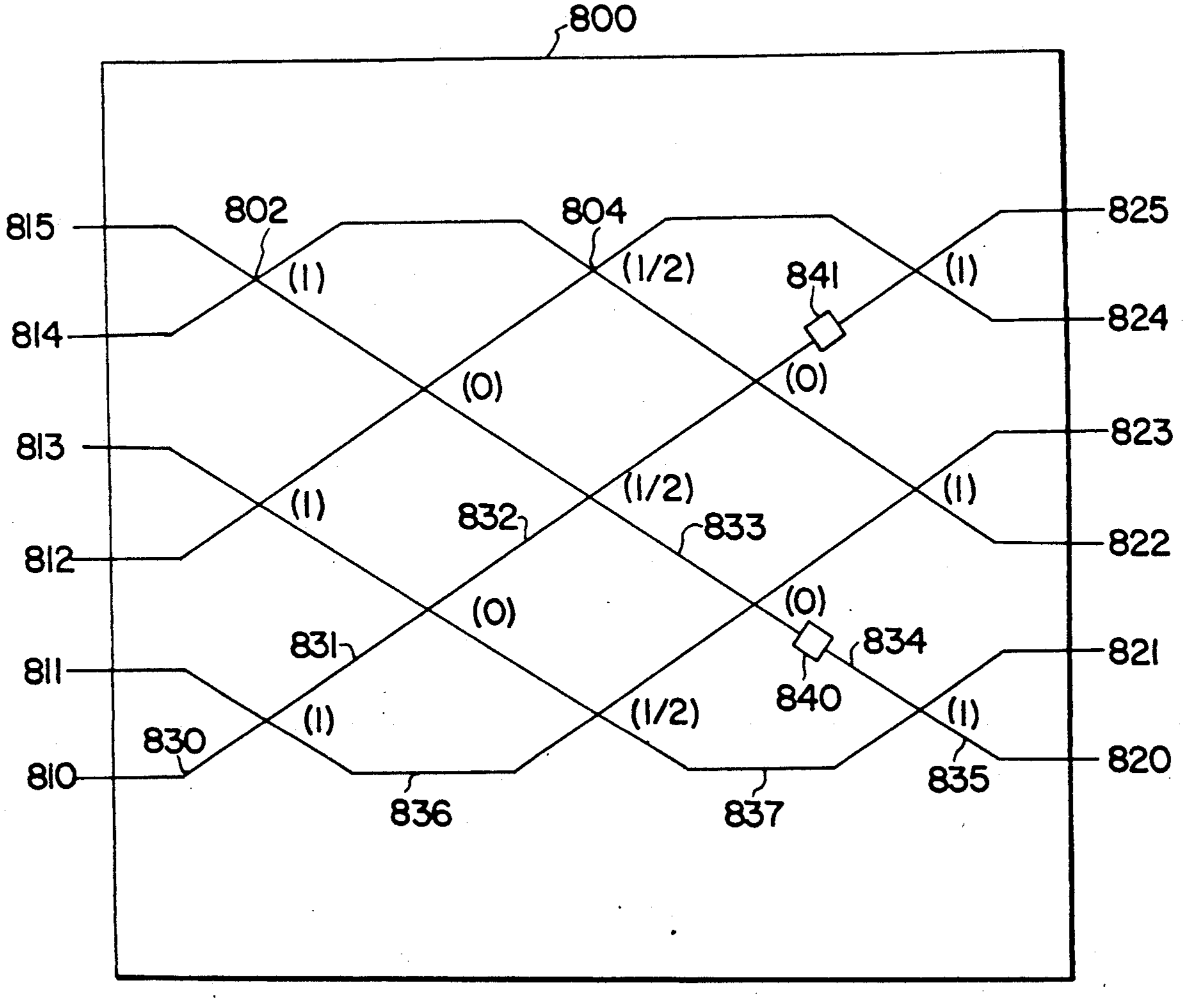
FIG. 7 is a 6-to-6 mixing coupler using X couplers with a cross-to-straight through power splitting ratio shown in parenthesis.

FIG. 7 is an example of a more efficient mixing coupler 800 for a 6×6 mixing coupler. Note that one of the output lines 820–825 will not be connected to make the 6×6 mixing coupler a 6×5 or 2N-to-(2N−1) mixing coupler. The mixing coupler 800 is composed of multiple X couplers only two of which are labeled for simplicity of illustration, e.g., 802 and 804. Each coupler is of the same construction as shown in FIG. 3C. Each X coupler is controlled by an electrode such as electrode 320 shown in FIG. 3C to have a cross to straight-through power ratio shown in parenthesis in FIG. 7. The ratios are set so that light introduced into any input line 810–815 is distributed equally to all output lines 820–825. For example, tracing the signal from input 810 to output 820, light travels along lines 830–831–832–833–834–835 and 830–836–837–835. Along the first set of lines 830–831–832–833–834–835, the power arriving out of each X coupler is from lines 830–831=½, 831–832=1, 832–833=⅓, 833–834=1, and 834–835=½. Along the second set of lines 830–836–837–835, the power arriving out of each X coupler is from lines 830–836=½, 836–837=⅓, and 837–835=½. Thus, the total power arriving at port 820 is 1/12+178 =1/6 of the power from port 810.

In a similar fashion, it may be seen that from any input line 810–815, a total power of 1/6 the input line intensity is distributed to each output line 820–825.

Care must be taken to avoid unwanted interference effects in this coupler. As only two incoherent inputs are on at a time many of these effects are avoided. None the less phase shift elements 840 and 841 may be needed. Details on this type of coupler can be found in M. E. Marhic, Hierarchic and Combinatorial Star Couplers, Optic Letters, Vol. 9, No. 8, August 1984, (pp. 368–370) incorporated herein by reference.

Figure 4:
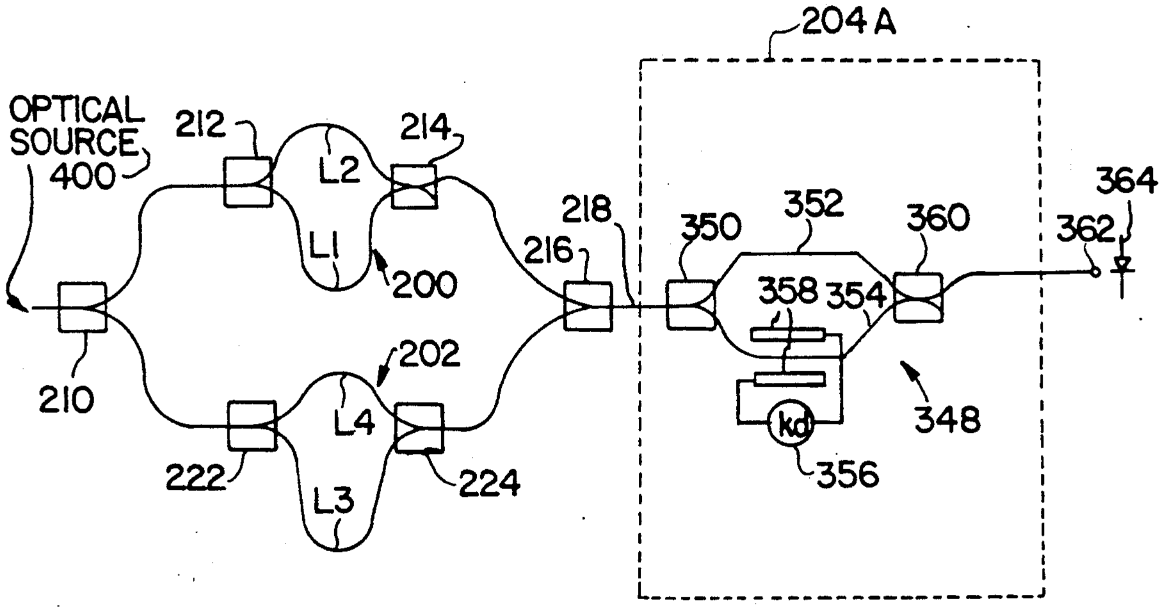
FIG. 4 is a coherence multiplexing system using fixed arm length sensors and a variable arm length detector.

The overall effect of blocks 400–975 is to multiplex a signal in a somewhat similar fashion as the multiplexer of FIG. 4. The effect of blocks 400–800 in FIG. 5 with one switch turned on in each channel is to form a single sensor such as sensor 200 in FIG. 4. Each output of the mixing coupler 800 is connected to one of the detectors 900 of FIG. 5. Each of detectors 900 of FIG. 5 is set to have a delay kd to perform like the detector unit 204A in FIG. 4 by outputting a signal at an optical output 950 if the sensor delay matches its delay kd. The optical outputs 950 are connected to detectors 900 and provide output light to optional photo diodes 975 to thereby generate an electrical signal, if desired.

Figures 2A, 2B:
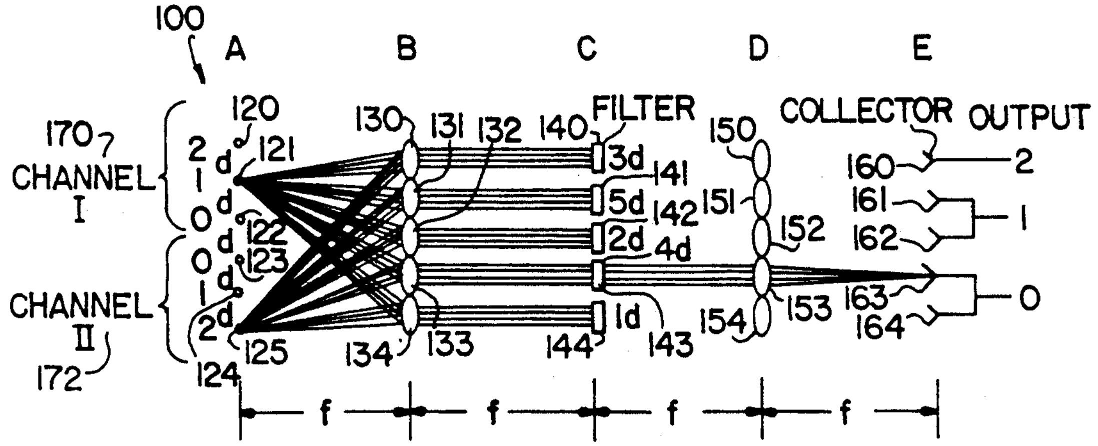
FIG. 2A is a drawing of a parallel optical radix 3 adder.
FIG. 2B is an input/output table for the parallel optical adder shown in FIG. 2A.
Figure 3B:
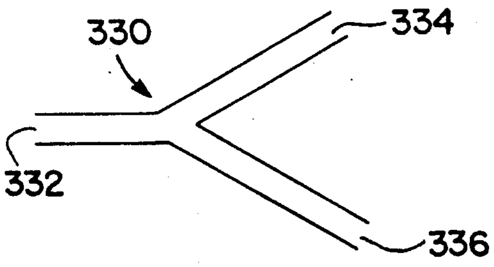
FIG. 3B shows a 1-to-2 or Y coupler.

FIG. 5 can also be used to perform the arithmetic and logic functions as is done in the arithmetic/logic unit of FIG. 2A. Channel I (510) and channel II (520) are comparable with channel I (170) and channel II (172) shown in FIG. 2A. If, for example, the logic to be performed is residue addition using modulus 3, then in channel I and channel II, the integers 0 through 2 are represented with waveguide delays (178 )d, (3/2)d, and (5/2)d in channel I, and −(½)d, −(3/2)d, and −(5/2)d in channel II. Outputs of each of detectors 900 in FIG. 5 are comparable to the arithmetic/logic filters 140–144 paired with lenses 150–154 and collected by collectors 160–164 of FIG. 2A. The outputs of signals from detectors 900 in FIG. 5 can be tied together to form residue arithmetic/-logic outputs in a similar fashion as shown in FIG. 2A.

Figure 8:
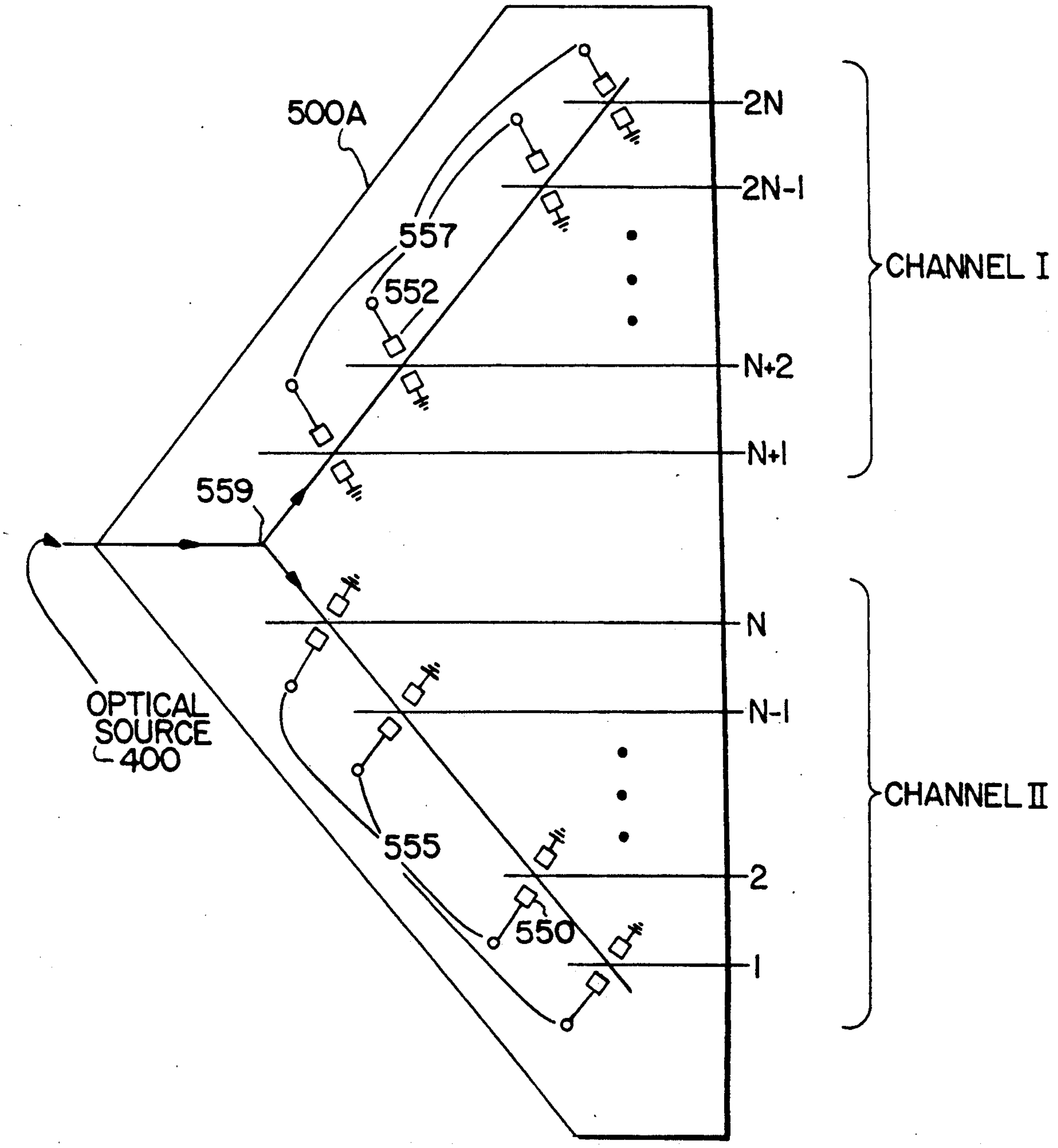
FIG. 8 shows the two 1-to-N switching systems as an alternative to the 1-to-2N manifold of FIG. 5 and forms the second embodiment of the present invention.

A second embodiment of the CMALU in accordance with this invention, is formed by removing switches 700 and 1-to-2N manifold 500 in FIG. 5. Manifold 500 is then replaced by the 1-to-N switch manifold 500A shown in FIG. 8. The second embodiment reduces power losses from ½N in the first embodiment to ½ by replacing manifolding which splits the input signal 400 into 2N outputs. The ½ power loss results from manifolding by only one Y coupler 559 which divides power between the two 1-to-N switches. Electrode lines 555 and 557 control the electrodes of the X couplers so that power travels down one of the 1,2,3, . . . N lines for channel II, or N+1, N+2, . . . 2N lines for channel I.

Figure 9A:
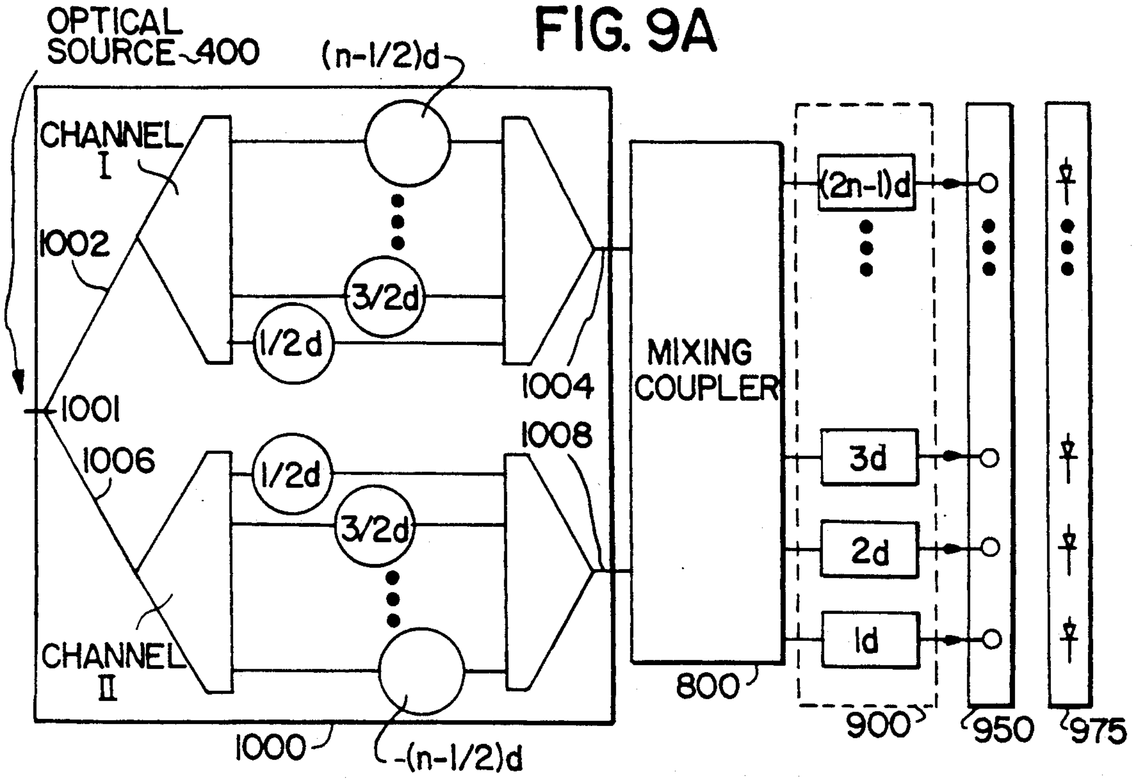
FIG. 9A is a diagram of the third embodiment of the present invention.

A third embodiment of the invention replaces elements 500, 600, and 700 of the first embodiment shown in FIG. 5 with a ganged switching system 1000 shown in FIG. 9A. In FIG. 9A, a signal from source 400 is manifolded using a Y coupler 1001 and directed down waveguide lines 1002 and 1006. The signals then proceed through ganged switches and are output at waveguides 1004 and 1008.

Figure 9B:
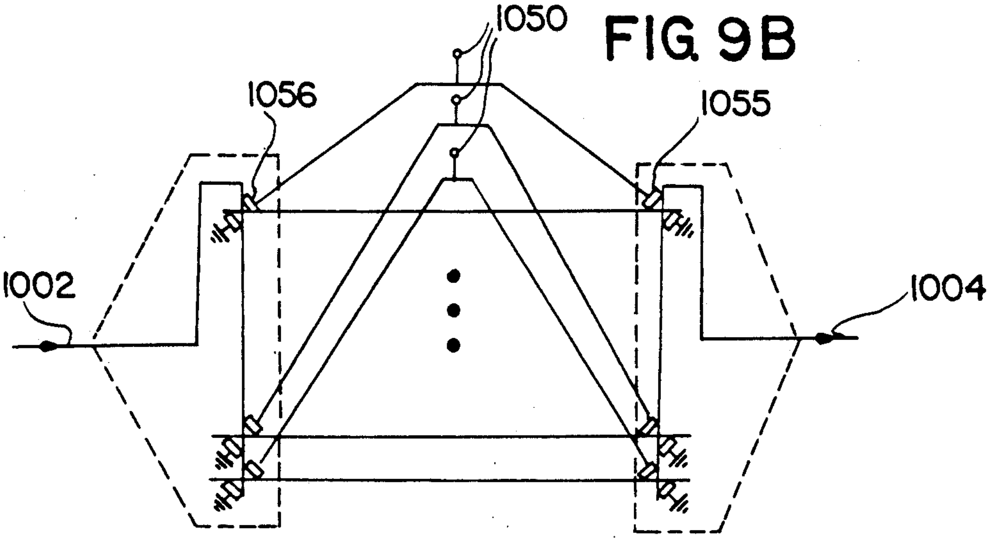
FIG. 9B is a diagram of ganged switches of the third embodiment.

In FIG. 9B the ganged switch configuration for the switch between lines 1002–1004 is shown. In the ganged switch of FIG. 9B, a signal from line 1002 is directed down a selected delay line by one of electrode lines 1050 which gang together two switching X couplers such as 1055–1056. The signal is then output through waveguide 1004 to two inputs of the 2-to-2N mixing coupler 800. Note that the normal 2N-to-(2N−1) mixing coupler may be used with input lines disconnected.

Figures 10A, 10B, 10C:
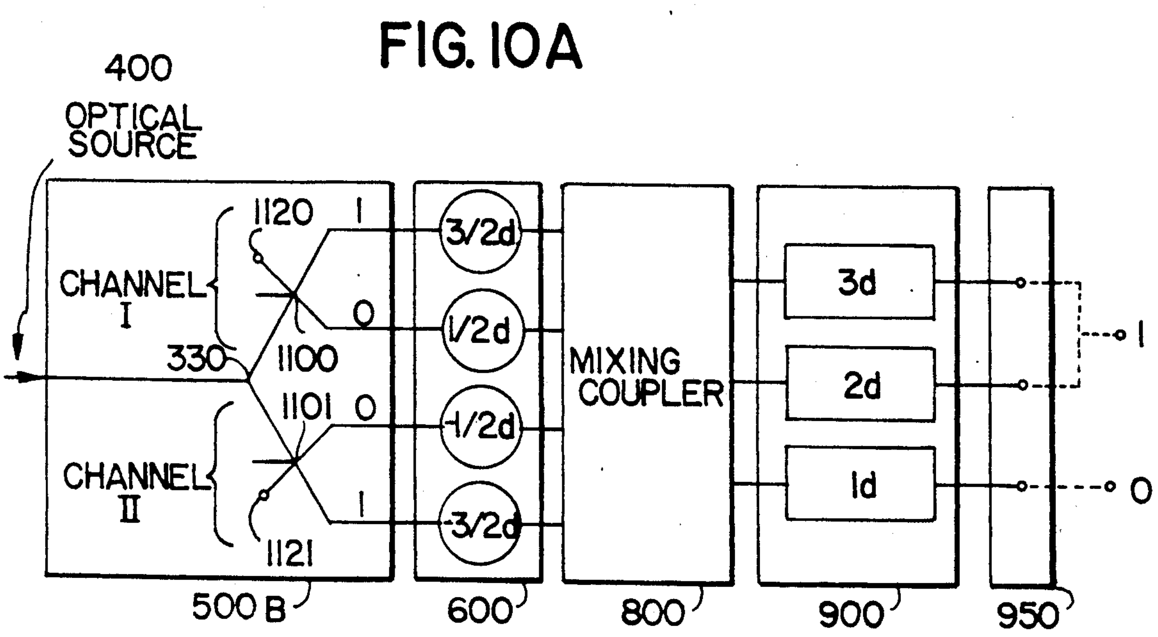
FIG. 10A is a fourth embodiment of the present invention for performing Boolean logic.
FIG. 10B is a Boolean logic OR gate truth table.
FIG. 10C is the output of the OR gate optical signal delay distances.

A fourth embodiment of the invention shown in FIG. 10 performs Boolean logic. The fourth embodiment is a variation of the second embodiment with manifold 500 of FIG. 5 replaced by push-pull manifold 500B in FIG. 10A and by using only two delay lines per channel. This embodiment uses two X couplers 1100 and 1101 as switches. Electrode lines 1120 and 1121 are fed by the two Boolean logic inputs which direct the optical input signal 400 in either the 1 or 0 delay line. FIG. 10C shows the delay truth table which results from all possible switching configurations of channels I and II. If outputs **3*d* and 2*d* are tied together and labeled 1 while the 1*d* output is labeled 0** as shown by dashed lines in FIG. 10A, an OR gate is formed. FIG. 10B is the truth table for the OR gate which can be derived using FIG. 10C. By suitably combining outputs, operations OR, AND, XOR and their complements can be done with this as well as the other CMALU embodiments. A CMALU can also be configured to perform multi-input logic.

Note that in each CMALU embodiment two channels are used which are composed of N different delay lines each. This configuration is to facilitate understanding. As long as two different length delay lines are selected, the system will work without defining channels.

Although the invention has been described above with particularity, this was merely to teach one of ordinary skill in the art how to make and use the invention. Many modifications will fall within the scope of the invention, as that scope is defined by the following claims.

What is claimed is:

1. A method for performing an arithmetic operation comprising the following steps:

(a) generating an optical signal;

(b) providing two sets of N delay lines per set, each set serving to represent a positionally encoded number in a residue number system, where N is an integer greater than 1, and wherein each delay line has a different delay length;

(c) selecting two of said delay lines, one from each set;

(d) feeding said optical signal into said selected delay lines;

(e) using said delay lines, delaying differently each of said selected delayed signals to provide two selected delayed optical signals;

(f) multiplexing said two selected delayed optical signals to cause an interference pattern; and (g) detecting from said interference pattern of said multiplex signals a delay difference corresponding to the difference in delay time between said two selected delayed optical signals, and defining said detected delayed difference as an output for said arithmetic operation.

2. An optical computer arithmetic/logic unit using coherence multiplexing comprising:

(a) an optical source of a predetermined coherence length;

(b) a manifold which directs light from said optical source;

(c) a plurality of delay lines each having a length difference from another delay line much larger than said coherence length;

(d) a plurality of optical switches which allow light to travel through two of said plurality of delay lines at a given time to thereby provide two selected delayed optical signals;

(e) a mixing coupler having inputs connected to receive the light from said two selected delayed optical signals and having a plurality of output lines, said mixing couple dividing light from each of said two selected delayed optical signals equally into its output lines; and (f) interferometer detectors connected to each of said mixing coupled output lines, each interferometer detector being set to detect a delay difference between different predetermined pairs of and plurality of delay lines.

3. An optical computer arithmetic/logic unit as claimed in claim 2, wherein said manifold comprises one or more Y couplers.

4. An optical computer arithmetic/logic unit as claimed in claim 2, wherein said delay lines consist of two channels of N delay lines, each channel serving as a modulus for residue arithmetic, where N is an integer greater than 1.

5. An optical computer arithmetic/logic unit as claimed in claim 2, wherein said mixing coupler comprises X couplers with a cross to straight through ratio set to equally distributes light from each input to each of its output lines.

6. An optical computer arithmetic/logic unit as claimed in claim 2, wherein each said interferometer detector comprises:

(a) a Y coupler which divides light received from a connected output line of said mixer coupler into a first and second output;

(b) first and second detector arms of different length connected at one end to said first and second outputs respectively of said Y coupler; and (c) an X coupler connected to another end to said first and second detector arms.

7. An optical computer arithmetic/logic unit using coherence multiplexing comprising:

(a) an optical source of a predetermined coherence length;

(b) a 1-to-2N manifold which divides light from said optical source into 2N outputs;

(c) 2N delay lines, each of said 2N delay lines connected to one output of said manifold, and each delay line having a length difference from another delay line much larger than said coherence length;

(d) 2N optical switches, each switch connected to one of said 2N delay lines and operable in a first mode to permit an optical signal to pass to an output of said delay line and operable in a second mode to block said optical signal from passing to said delay line output, two of said 2N optical switches simultaneously operable in said first mode for providing two selected delayed optical signals;

(e) a 2N-to-(2N−1) mixing coupler connected to each one of said 2N delay lines and, in operation, receiving said two selected delayed optical signals, said mixing coupler distributing said two selected delayed optical signals to (2N−1) outputs; and (f) (2N−1) interferometer detectors each having an input connected to one of said (2N−1) outputs of said mixing coupler, each interferometer detector receiving said distributed optical signals and being tuned to detect a delay difference between a different predetermined pair of said 2N delay lines.

8. An optical computer arithmetic/logic unit as claimed in claim 7, wherein said manifold comprises one or more Y couplers.

9. An optical computer arithmetic/logic unit as claimed in claim 7, wherein said 2N delay lines comprise two channels of N delay lines, each channel serving to represent a positionally encoded number in a residue number system representation.

10. An optical computer arithmetic/logic unit as claimed in claim 7, wherein said mixing coupler comprises X couplers with a cross to straight through ratio set to equally distributes each optical signal to each of its outputs.

11. An optical computer arithmetic/logic unit as claimed in claim 7, wherein each said interferometer detector comprises:
(a) a Y coupler which divides said received, distributed optical signal into a second signal along first and second outputs;
(b) a first and second detector arms connected at one end to said first and second outputs respectively of said Y coupler; and
(c) an X coupler connected to another end to said first and second detector arms.

12. An optical computer arithmetic/logic unit using coherence multiplexing comprising:
(a) an optical source of a predetermined coherence length;
(b) a manifold which divides an optical signal from said optical source into two outputs;
(c) two sets of N delay lines, each delay line having a length difference form another delay line much larger than said coherence length;
(d) two 1-to-N switches, each switch directing an optical signal from said manifold down one of said two sets of N delay lines to thereby produce two selected delayed optical signals;
(e) a 2N-to-(2N−1) mixing coupler connected to each one of said 2N delay lines, and, in operation, receiving said two selected delayed optical signals, said mixing coupler distributing said two selected delayed optical signals to (2N−1) outputs; and
(f) (2N−1) interferometer detectors each having an input connected to one of said (2N−1) outputs of said mixing coupler, each interferometer detector receiving said distributed optical signals and being tuned to detect a delay difference between a different predetermined pair of said delay lines.

13. An optical computer arithmetic/logic unit as claimed in claim 12, wherein each of said two 1-to-N switches comprises one channel, each channel serving to represent a positionally encoded number in a residue number system representation.

14. An optical computer arithmetic/logic unit as claimed in claim 12, wherein said mixing coupler comprises X couplers with a cross to straight through ratio set to equally distributes each optical signal to each of its outputs.

15. An optical computer arithmetic/logic unit as claimed in claim 12, wherein each said interferometer detector comprises:
(a) a Y coupler which divides said received, distributed optical signal into a second signal along first and second outputs;
(b) a first and second detector arms connected at one end of said first and second outputs respectively to said Y coupler; and
(c) an X coupler connected to another end to said first and second detector arms.

16. An optical computer arithmetic/logic unit using coherence multiplexing comprising:
(a) an optical source of a predetermined coherence length;
(b) a manifold which divides light from said optical source into two output light sources;
(c) two sets of N delay lines, each delay line having a length difference from other delay lines much larger than said coherence length;
(d) two sets of ganged 1-to-N and N-to-1 switches each having a single output and each sandwiching a set of said N delay lines, each of said ganged switches directing an optical signal from one output of said manifold down one of said N delay lines and out said single output;
(e) a 2-to-(2N−1) mixing coupler connected to each of said ganged switches, said mixing coupler distributing said optical signal of each ganged switch to (2N−1) outputs; and
(f) (2N−1) interferometer detectors each having an input connected to one of said (2N−1) outputs of said mixing coupler, each interferometer detector receiving said distributed optical signals and being tuned to detect a delay difference between a different predetermined pair of said delay lines.

17. An optical computer arithmetic/logic unit as claimed in claim 16, wherein each of said sets of N delay lines make up a channel, each channel serving to represent a positionally encoded number in a residue number system representation.

18. An optical computer arithmetic/logic unit as claimed in claim 16, wherein said mixing coupler comprises X couplers with a cross to straight-through ratio set to equally distribute each optical signal to each of its outputs.

19. An optical computer arithmetic/logic unit as claimed in claim 16, wherein each said interferometer detector comprises:
(a) a Y coupler which divides said received, distributed optical signal into a second signal along first and second outputs;
(b) a first and second detector arms connected at one end to said first and second outputs respectively of said Y coupler; and
(c) an X coupler connected to another end to said first and second detector arms.

20. An optical computer arithmetic/logic unit using coherence multiplexing to perform Boolean logic comprising:
(a) an optical source of a predetermined coherence length;
(b) a manifold which divides light from said optical source into two outputs;
(c) two X couplers, each X coupler connected to receive one output of said manifold, each X coupler having an electrode for operably directing a signal to one of two outputs depending upon a voltage on said electrode, said voltage corresponding to a Boolean logic input;
(d) delay lines connected to each X coupler output, each delay line having a length difference from other delay lines much larger than said coherence length;
(e) a 4×3 mixing coupler connected to each one of said delay lines, said mixing coupler distributing an optical signal of each delay line to three outputs; and
(f) three interferometer detectors each having an input connected to one of said three outputs of said mixing coupler, each interferometer detector receiving said distributed optical signals and being set to detect a delay difference between a different predetermined pair of said delay lines.

21. An optical computer arithmetic/logic unit as claimed in claim 20, wherein said mixing coupler comprises X couplers with a cross to straight through ratio set to equally distributes each optical signal to each of its outputs.

22. An optical computer arithmetic/logic unit as claimed in claim 20, wherein each said interferometer detector comprises:

(a) a Y coupler which divides said received, distributed optical signal into a second signal along first and second outputs;

(b) a first and second detector arms connected at one end to said first and second outputs respectively of said Y coupler; and (c) an X coupler connected to another end to said first and second detector arms.

* * * * *